United States Patent [19]

Deutschle

[11] Patent Number: 4,603,768
[45] Date of Patent: Aug. 5, 1986

[54] APPARATUS FOR TRANSPORTING PAPER STACKS

[75] Inventor: Robert Deutschle, Bokholt-Hanredder, Fed. Rep. of Germany

[73] Assignee: E. C. H. Will (GmbH & Co.), Hamburg, Fed. Rep. of Germany

[21] Appl. No.: 576,193

[22] Filed: Feb. 2, 1984

[30] Foreign Application Priority Data

Feb. 4, 1983 [DE] Fed. Rep. of Germany ....... 3303712

[51] Int. Cl.$^4$ ............................................. B65G 47/10
[52] U.S. Cl. .................................... 198/369; 198/584
[58] Field of Search .............. 198/369, 436, 448, 586, 198/583, 584, 574, 592

[56] References Cited

U.S. PATENT DOCUMENTS

| | | | |
|---|---|---|---|
| 3,373,664 | 3/1968 | Brockmuller | 198/436 X |
| 3,561,625 | 2/1971 | Diogvardi | 198/584 |
| 4,056,186 | 11/1977 | Hill | 198/339 |
| 4,270,655 | 6/1981 | Noe | 198/584 X |
| 4,478,329 | 10/1984 | Heiz | 198/574 |

Primary Examiner—Joseph E. Valenza
Assistant Examiner—Michael Stone
Attorney, Agent, or Firm—Peter K. Kontler

[57] ABSTRACT

Apparatus for transporting paper stacks has two spaced-apart transporting units each having a supplying conveyor which can accept stacks from a maker or feeder, an intermediate conveyor which can accept stacks from the supplying conveyor, and a receiving conveyor which can accept stacks from the intermediate conveyor for delivery to a packing machine. A third receiving conveyor is disposed between the receiving conveyors of the two transporting units and serves to deliver stacks to a third packing machine. The intermediate conveyors can be linked to each other for simultaneous movement transversely of the transporting units so that one of the intermediate conveyors registers with the third receiving conveyor while the other intermediate conveyor receives one or more stacks from the supplying conveyor of the corresponding transporting unit. This enables the third receiving conveyor to alternately deliver to the corresponding packing machine stacks which are furnished by the supplying conveyors of both transporting units. One of the intermediate conveyors can be driven to move transversely of the transporting units.

17 Claims, 4 Drawing Figures

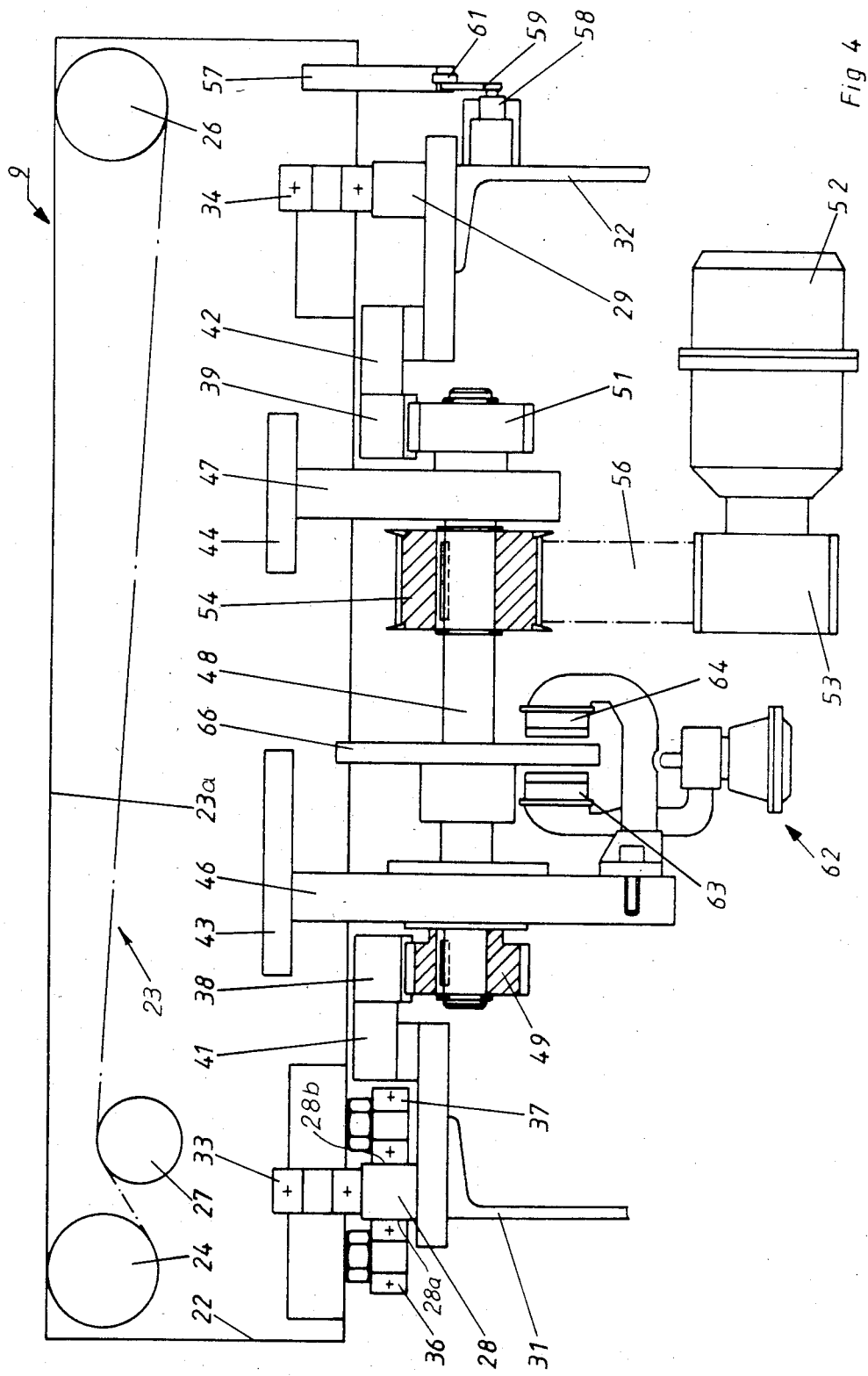

APPARATUS FOR TRANSPORTING PAPER STACKS

BACKGROUND OF THE INVENTION

The present invention relates to apparatus for transporting sheet- or plate-like commodities, particularly for transporting stacks of paper sheets between one or more first stations and one or more second stations. For example, the apparatus of the present invention can be utilized to transport stacks of paper sheets from one or more machines which convert large sheets or rolls of paper into stacks of legal size or letter size and one or more packing machines wherein the stacks are introduced into cartons or other types of receptacles.

Stacks of superimposed paper sheets must be transported in such a way that their sheets remain in positions of accurate alignment with one another. This is a prerequisite for predictable introduction of stacks into properly dimensioned cartons or other types of receptacles (as a rule, the dimensions of such receptacles barely suffice to permit insertion of stacks of paper sheets). Thus, it is necessary to avoid abrupt acceleration or deceleration of stacks and/or their conveyors during transport from the stacking station to the packing station. It is also desirable and advantageous to avoid the application of pronounced shocks and/or abrupt changes in the direction of transport because all such influences can adversely affect the configuration of stacks which arrive at the packing station. Careful transport of stacked paper sheets is even more important in modern high-speed paper processing plants wherein each packing machine must pack a large number of stacks per unit of time so that there is no time left for realignment of sheets in a stack prior to introduction into a receptacle.

In many presently known plants for the processing of sheets of paper or other sheet material, stacks of paper sheets or other sheet-like commodities are transported by elongated transporting units each of which normally comprises a first or supplying conveyor serving to accept stacked sheets from a stacking or other stack-feeding or stack-storing unit, an intermediate conveyor which receives successive stacks or groups of stacks from the supplying conveyor, and a third or receiving conveyor which accepts the stacks or groups of stacks from the intermediate conveyor. The receiving conveyor can deliver stacks or groups of stacks directly to a packing machine or to one or more further conveyors which serve to deliver stacks or groups of stacks to one or more packing machines. As a rule, each such conveyor comprises a table-like frame and an endless belt or band which is recessed into the frame and whose flat upper reach is flush with the upper side of the frame. A large paper processing plant will comprise a large number of magazines for discrete stacks or groups of stacks, an equal number of packing machines, and a discrete multi-conveyor transporting unit for each packing machine. Such plants exhibit the drawback that their machines are not used to capacity under any and all circumstances which develop in actual operation. For example, it is often necessary to operate a packing machine at less than full capacity at which time a single transporting unit suffices to deliver stacks at a requisite frequency. However, such single transporting unit is incapable of satisfying the needs of a high-speed packing machine when the latter is operated at or close to maximum capacity.

It is already known, in fields of endeavor other than processing of stacked paper sheets or the like, to convert plural transporting units into a larger-capacity transporting unit or vice versa. As a rule, the plural transporting units are designed to advance commodities in different directions. Such transporting units cannot be used for the transport of unconfined stacks of paper sheets or the like because they would be incapable of delivering stacks to their destination without at least some shifting of neighboring sheets or without at least some shifting of lowermost sheets with reference to their supports, especially if they were to be operated at a speed which is required in a modern paper processing plant.

OBJECTS AND SUMMARY OF THE INVENTION

An object of the invention is to provide a novel and improved apparatus which can predictably transport unconfined stacks of paper sheets or the like between one or more first stations and one or more remote second stations without risking misalignment of sheets in the stacks.

Another object of the invention is to provide a compact apparatus which can be used to transport stacked paper sheets or the like from one or more sources to a single destination or to two or more different locations.

A further object of the invention is to provide an apparatus whose operation can be automated, either fully or to a desired extent, to ensure rapid conversion from transport of stacks to a single destination to transport of stacks to two or more spaced-apart locations.

An additional object of the invention is to provide a novel and improved system of conveyors for use in an apparatus of the above outlined character.

Still another object of the invention is to provide an apparatus which can treat stacked paper sheets and stacks of sheets gently, without any shifting, and which can ensure that the orientation of stacks remains unchanged even though the path along which the stacks must advance to one or more destinations is altered for the purpose of directing all stacks to one and the same station or to two or more discrete stations.

A further object of the invention is to provide a novel and improved method of manipulating paper stacks or the like between one or more sources and one or more packing machines or other stack processing machines.

An additional object of the invention is to provide novel and improved conveyor means for use in the above outlined apparatus.

Still another object of the invention is to provide an apparatus which can be installed in existing paper processing or like plants as a superior substitute for heretofore known apparatus.

The invention is embodied in an apparatus for transporting stacked sheet-like commodities, particularly paper stacks, from a first location (e.g., a sheet processing station) to a second location (such as a packing station for stacked sheets). The apparatus comprises first and second elongated transporting units which respectively include first and second supplying conveyors arranged to receive commodities (e.g., groups of several paper stacks) from the first processing station, first and second intermediate conveyors which are respectively arranged to receive commodities from the first and second supplying conveyors, and first and second receiving conveyors which are respectively arranged to accept commodities from the first and second intermediate conveyors. The apparatus further comprises a third receiving conveyor which is preferably disposed midway between the first and second receiving conveyors. In accordance with a feature of the invention, each of the intermediate conveyors is movable from a position of register with the supplying and receiving conveyors of the respective transporting unit to a position of register with the third receiving conveyor. Each conveyor preferably comprises at least one endless band or belt having a flat upper reach serving to transport commodities in a predetermined plane, e.g., in a horizontal plane.

The apparatus preferably further comprises means for separably locking the intermediate conveyors to each other for joint movement substantially transversely of the transporting units which may but need not be exactly parallel to each other. Still further, the apparatus preferably comprises drive means for moving at least one of the intermediate conveyors transversely of the transporting units (such movement of the one intermediate conveyor is shared by the other intermediate conveyor when the two intermediate conveyors are locked to each other). When the locking means is operative, the intermediate conveyors are jointly movable between a first end position in which the first intermediate conveyor registers with the first receiving conveyor and the second intermediate conveyor registers with the third receiving conveyor, and a second end position in which the first intermediate conveyor registers with the third receiving conveyor and the second intermediate conveyor registers with the second receiving conveyor. The locking means is disengageable to allow for independent movement of the first and second intermediate conveyors into register with the first and second receiving conveyors, respectively. Such apparatus preferably further comprises means for releasably holding the first intermediate conveyor in a position of register with the first supplying and receiving conveyors and for releasably holding the second intermediate conveyor in a position of register with the second supplying and receiving conveyors. For example, the locking means can comprise at least one first locking element on the first intermediate conveyor, at least one complementary second locking element on the second intermediate conveyor, and coupling means (e.g., a bolt which is insertable into registering apertures of the first and second locking elements) for separably securing the first and second locking elements to one another. Such apparatus can comprise electromagnetic or fluid-operated (hydraulic or pneumatic) means for moving the coupling element into and/or from engagement with the locking elements.

The apparatus preferably further comprises one or more guide rails for one or both intermediate conveyors; such guide rail or guide rails extend transversely of the transporting units. At least one of the intermediate conveyors preferably comprises one or more antifriction bearings which serve to track the rail or rails and constitute one or more wheels for rolling movement of the one intermediate conveyor between the positions of register with the receiving conveyor of the respective transporting unit and the third receiving conveyor. In addition to the just discussed bearing or bearings, the one intermediate conveyor can comprise at least one pair of additional antifriction bearings (e.g., ball or roller bearings) which can track the respective sides or flanks of at least one of the rails to ensure that the one intermediate conveyor cannot be derailed during movement between the position of register with the receiving conveyor of the respective transporting unit and the third receiving conveyor.

The drive means for moving the one intermediate conveyor between the positions of register with the receiving conveyor of the respective transporting unit and the third receiving conveyor can comprise a rack and pinion drive which can include a shaft mounted in or on the one intermediate conveyor, at least one pinion on the shaft, a toothed rack adjacent to the path of movement of the one intermediate conveyor and meshing with the pinion (the rack is preferably parallel to the guide rail or guide rails) and prime mover means (e.g., a motor and a toothed belt transmission) for rotating the pinion on or with the shaft to thereby move the one intermediate conveyor along the guide rail(s). A braking means (e.g., a disc brake) can be provided on the one intermediate conveyor to be actuated when the one intermediate conveyor reaches or approaches the one or the other end position. Limit switches (cooperating with one or more trips on the one intermediate conveyor and installed in the circuit of the aforementioned motor) can be provided to arrest the one intermediate conveyor in positions of exact register with the receiving conveyor of the respective transporting unit and with the third receiving conveyor.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is an enlarged longitudinal vertical sectional view of the driven intermediate conveyor, substantially as seen in the direction of arrows from the line A—A of FIG. 3.

DESCRIPTION OF THE PREFERRED EMBODIMENTS

Figure 1:
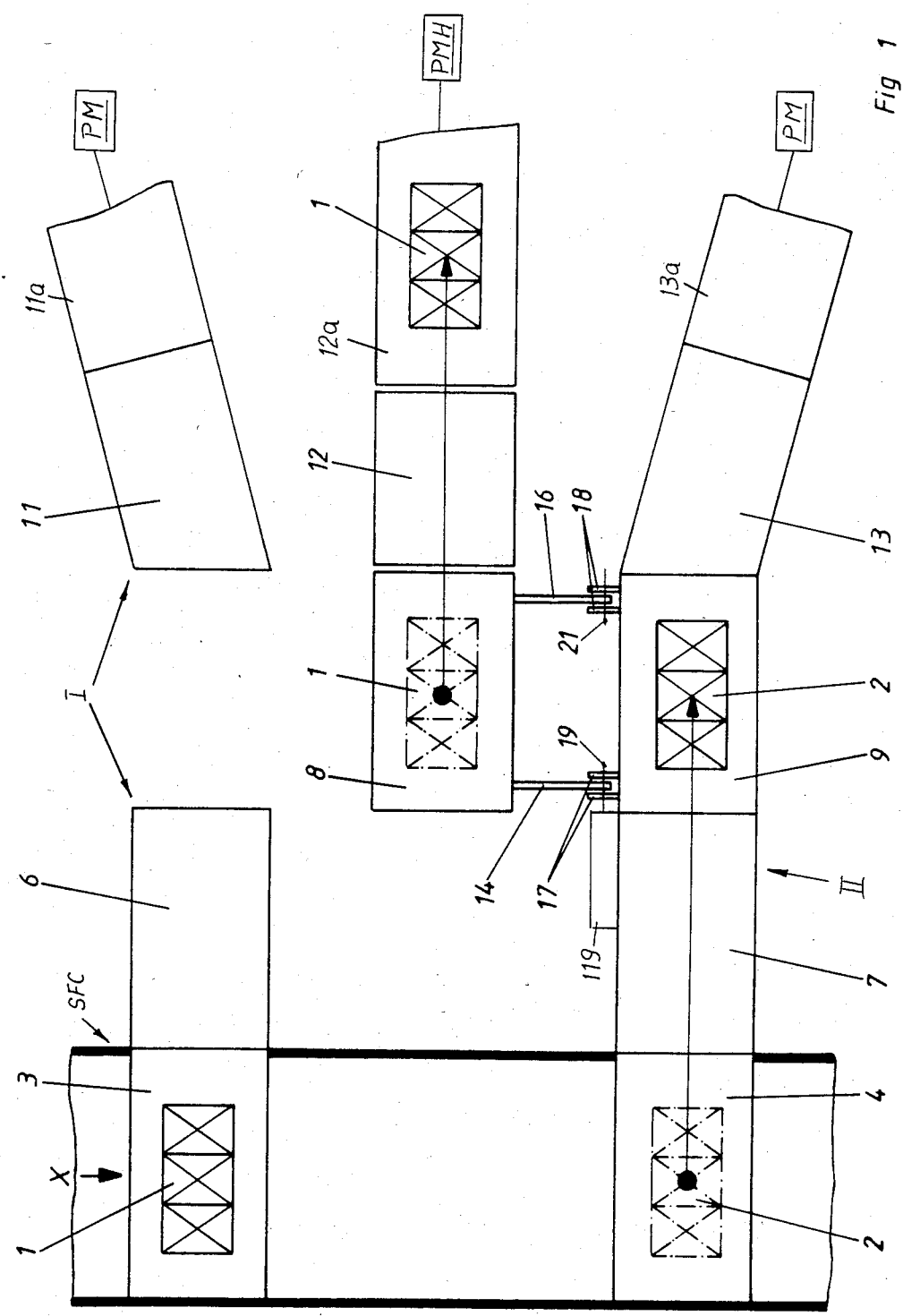
FIG. 1 is a schematic plan view of an apparatus which embodies the invention, with one of the intermediate conveyors shown in register with the third receiving conveyor.
Figure 2:
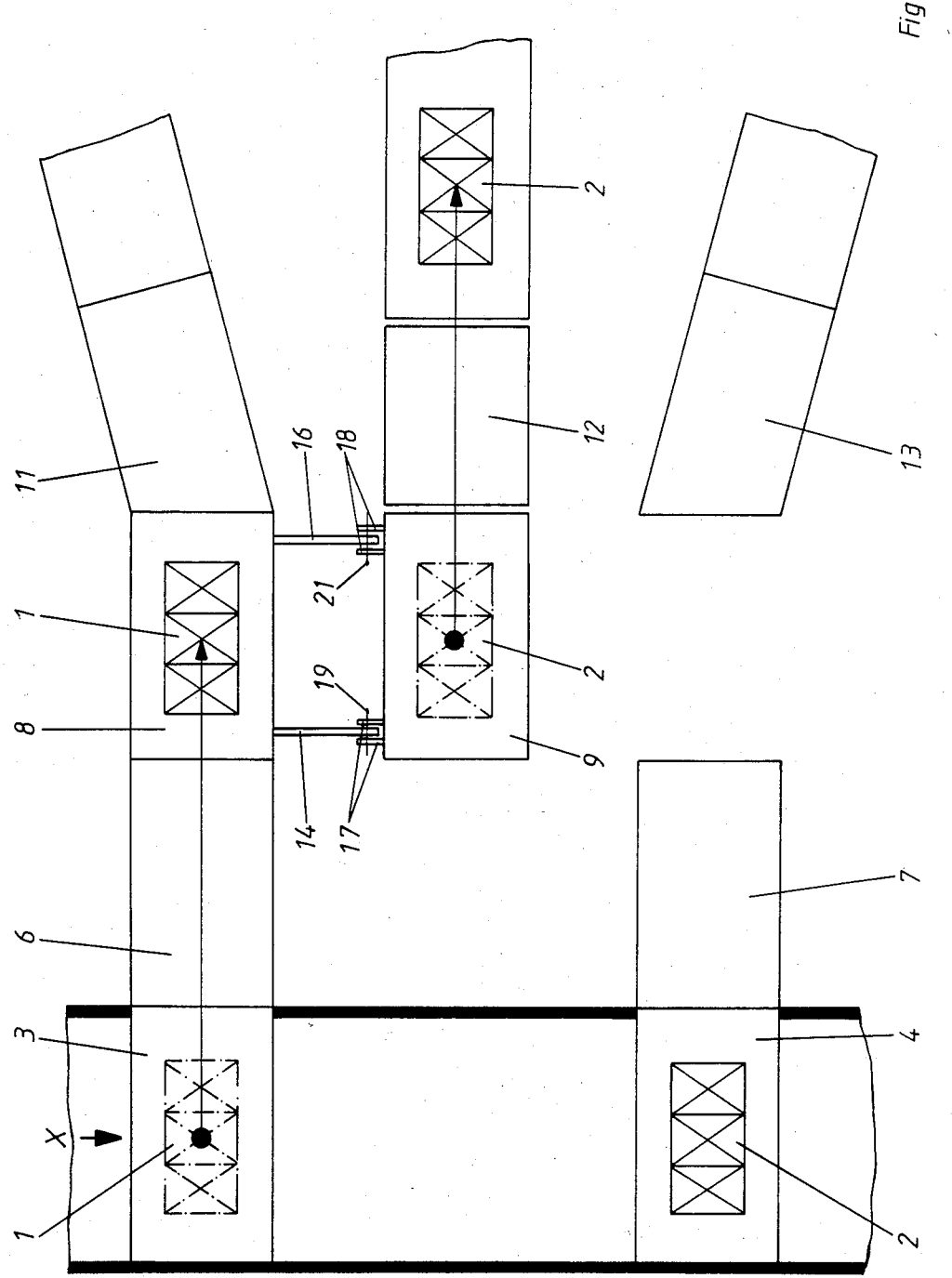
FIG. 2 illustrates the structure of FIG. 1 but with the other intermediate conveyor in register with the third receiving conveyor.
Figure 3:
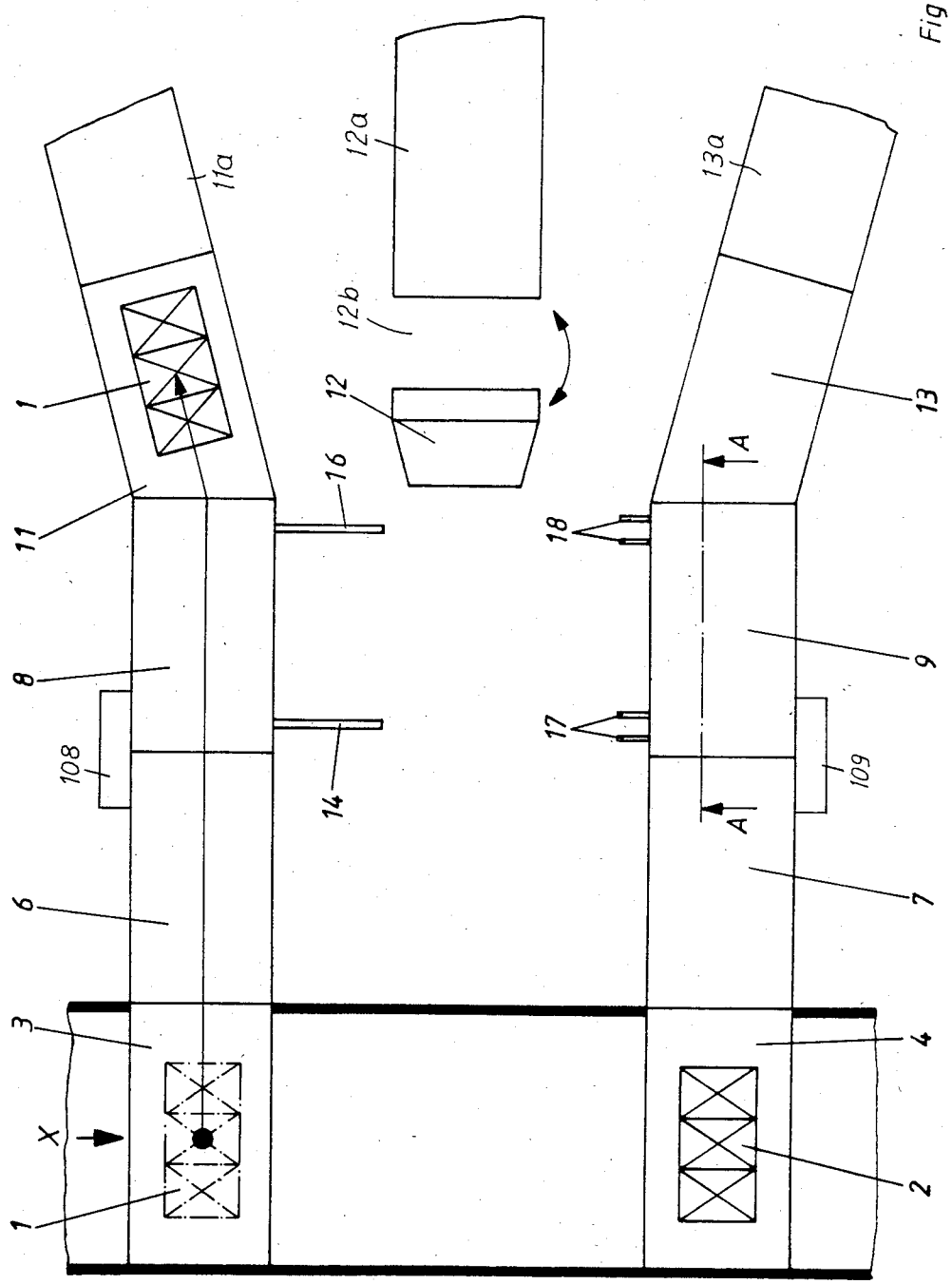
FIG. 3 shows the structure of FIG. 1 but with the intermediate conveyors disconnected from one another and each registering with one of the two supplying conveyors.

Referring first to FIGS. 1 to 3, there is shown an apparatus which serves to transport groups of paper stacks 1 and 2 from a first station including two magazines 3, 4 to a second station which accommodates several packing machines PM and PMH. The magazines 3 and 4 are spaced apart from one another and can receive discrete stacks 1, 2 or groups of three stacks each from a stack feeding conveyor SFC serving to advance stacks in the direction which is indicated by the arrow X. The conveyor SFC receives stacks from a machine or a production line which is designed to sever large sheets or rolls so that each sheet or roll yields a large number of discrete sheets which are thereupon superimposed upon one another to form a succession of stacks 1 and 2. A machine which can feed stacks to the magazines 3 and 4 of the improved apparatus is disclosed, for example, in commonly owned U.S. Pat. No. 4,223,777 granted Sept. 23, 1980 to Kurt Aykut (note the lower portion of FIG. 1 in this patent). A machine which can accumulate sheets or smaller stacks of sheets into larger stacks is disclosed, for example, in commonly owned U.S. Pat. No. 4,249,844 granted Feb. 10, 1981 to Siegfried Lampe et al. A packing machine which can introduce stacks 1 and/or 2 into suitable receptacles is disclosed, for example, in commonly owned U.S Pat. No. 4,237,674 granted Dec. 9, 1980 to Kurt Aykut.

The apparatus of the present invention comprises two elongated transporting units I and II which respectively include stack supplying conveyors 6, 7, intermediate conveyors 8, 9 and stack receiving conveyors 11, 13. The supplying conveyor 6 can remove or receive groups of three stacks 1 each from the magazine 3 and delivers such groups to the intermediate conveyor 8 which can advance the groups of stacks 1 into the range of or onto the receiving conveyor 11. The latter delivers the groups of stacks 1 to the respective packing machine PM, either directly or through the medium of a further conveyor 11a. The supplying conveyor 7 can receive or remove groups of three stacks 2 each from the magazine 4 and delivers such groups into the range of or onto the intermediate conveyor 9 which delivers successive groups of three stacks 2 each into the range of or directly onto the receiving conveyor 13. The latter delivers the groups of stacks 2 to the respective packing machine PM, either directly or through the medium of an additional conveyor 13a.

In accordance with a feature of the invention, the apparatus of FIGS. 1 to 3 further comprises a third stack receiving conveyor 12 which is preferably disposed midway between the receiving conveyors 11, 13 of the transporting units I, II, and the intermediate conveyors 8, 9 are jointly movable transversely of the transporting units I, II between a first end position (shown in FIG. 1) in which they respectively register with the conveyor 12 and conveyors 7, 13 and a second end position (shown in FIG. 2) in which they respectively register with the conveyors 6, 11 and conveyor 12. The latter can deliver groups of three stacks 1 or 2 each to a third (high-speed) packing machine PMH, either directly, or through the medium of an additional conveyor 12a.

The means for releasably locking the intermediate conveyors 8, 9 to each other (as shown in FIGS. 1 and 2) comprises elongated first locking elements 14, 16 on the intermediate conveyor 8, complementary second locking elements 17, 18 on the intermediate conveyor 9, and coupling means in the form of locking bolts 19, 21 which can be used to separably attach the elements 14, 17 and 16, 18 to each other. To this end, the locking elements 14, 17 have registering apertures for the locking bolt 19 and the locking elements 16, 18 have registering apertures for the locking bolt 21. The bolts 19, 21 can be inserted or removed by hand or automatically, e.g., by electromagnetic means one of which (for the bolt 19) is indicated schematically at 119. A similar electromagnetic engaging and disengaging means can be provided for the bolt 21. If desired, the electromagnetic engaging and disengaging means can be replaced with fluid-operated (hydraulic or pneumatic) means without departing from the spirit of the invention. The fluid-operated means can comprise two cylinder and piston units whose piston rods can shift the respective bolts 19, 21 axially into and from the registering apertures of the associated locking elements 14, 17 and 16, 18 when the intermediate conveyors 8 and 9 are maintained at a requisite distance from each other (so that the conveyor 8 registers with the conveyor 11 or 12 while the conveyor 9 registers with the conveyor 12 or 13). If the locking means is disengaged, i.e., if the bolts 19 and 21 are retracted from the respective sets of registering apertures, the intermediate conveyors 8 and 9 are movable independently of each other into register with the conveyors 6, 11 and 7, 13 of the respective transporting units I and II (see FIG. 3). The intermediate conveyors 8 and 9 can be releasably held in such positions by discrete holding means 108, 109 which are shown schematically in FIG. 3 and each of which can comprise an eyelet (e.g., on the corresponding supply conveyor 6, 7) and a reciprocable bolt (on the respective intermediate conveyor 8, 9) which is insertable into and extractable from the respective eyelet. Other (more sophisticated) holding means can be used with equal or similar advantage.

One of the intermediate conveyors 8 and 9 is preferably coupled or otherwise associated with suitable drive means which enables or causes it to move between the positions shown in FIGS. 1, 2 and 3. In the illustrated embodiment, the drive means is associated with the conveyor 9 which can move the conveyor 8 between the positions of FIGS. 1 and 2 and which can move the conveyor 8 to the position of FIG. 3 (in which the holding means 108 releasably locks the conveyor 8 to the stack supplying conveyor 6) prior to returning to the position of FIG. 3 in order to be releasably locked to the conveyor 7 by the holding means 109. If desired, the apparatus of the present invention can be equipped with discrete drive means for each of the intermediate conveyors 8 and 9.

If the third receiving conveyor 12 is not disposed exactly midway between the receiving conveyors 11 and 13 (e.g., because the space which is available in a plant does not allow for such mounting of the conveyor 12), the means for locking the intermediate conveyors 8 and 9 to each other must or can be designed with a view to allow for requisite changes in the distance between the two intermediate conveyors. This can be readily accomplished by assembling the locking elements 14 and 16 of two or more telescoped tubular components.

If the intermediate conveyors 8 and 9 are properly locked to each other in a manner as shown in FIGS. 1 and 2, the apparatus can be operated as follows:

When the conveyors 8 and 9 assume the positions which are shown in FIG. 1, the supplying conveyor 7 is free to deliver a group of three stacks 2 from the magazine 4 (such group is indicated in FIG. 1 by phantom lines) onto the intermediate conveyor 9. At the same time, the intermediate conveyor 8 delivers a group of three stacks 1 (indicated by phantom lines) onto the receiving conveyor 12 which, in turn, delivers the group onto the additional conveyor 12a (such group is indicated by solid lines, the same as the group of stacks 2 subsequent to transfer onto the intermediate conveyor 9). When the transfers of a group of stacks 1 from the conveyor 8 onto the conveyor 12 and of a group of stacks 2 from the magazine 4 onto the conveyor 9 are completed, the intermediate conveyors 8 and 9 are moved transversely of the longitudinal directions of the transporting units I, II to assume the positions which are shown in FIG. 2. The intermediate conveyor 9 is then free to transfer a group of three stacks 2 onto the third receiving conveyor 12 and the intermediate conveyor 8 is free to receive a group of three stacks 1 from the magazine 3. Thus, the packing machine PMH (not shown in FIG. 2) alternately receives groups of stacks 1 and 2 while the receiving conveyors 11 and 13 of the two transporting units I and II are idle.

The intermediate conveyors 8, 9 are thereupon returned to the positions which are shown in FIG. 1 so that the conveyor 8 can deliver a group of three stacks 1 to the third receiving conveyor 12 while the conveyor 9 receives a group of three stacks 2 from the magazine 4. The same procedure is repeated again and again so that the packing machine PMH receives groups of stacks 1 and 2 at a required frequency.

If the stacks 1 and 2 are to be respectively delivered to the receiving conveyors 11 and 13, the bolts 19 and 21 are disengaged from the respective locking elements 14, 17 and 16, 18 so that the intermediate conveyors 8 and 9 are movable independently of one another. The conveyor 8 is moved (by the conveyor 9) into register with the conveyors 6, 11 of the transporting unit I, and the conveyor 9 is driven to the position of register with the conveyors 7, 13. The conveyor 12 is then idle and the conveyors 11, 13 respectively deliver groups of three stacks 1 and 2 each to the corresponding packing machines PM. The transporting unit I may but need not be operated in synchronism or simultaneously with the transporting unit II. For example, the transporting unit II can be idle while the transporting unit I advances successive groups of stacks 1, or vice versa. When the intermediate conveyors 8 and 9 are held and preferably locked in the positions of FIG. 3, the third receiving conveyor 12 can be pivoted (so that its left-hand end portion, as viewed in FIG. 1 or 2, is moved to a level below its right-hand end portion) to the position of FIG. 3 in which the conveyors 12 and 12a define a pathway which enables an attendant to move between the conveyors 11, 13 without walking around the conveyor 12 or 12a.

FIG. 4 shows the details of the intermediate conveyor 9 and of the drive means therefor. The conveyor 9 comprises a rigid table-like frame 22 supporting the pulleys 24, 26, 27 for an endless belt or band 23 having a flat horizontal upper reach 23a which is flush with the upper side of the frame 22. One of the pulleys 24, 26, 27 is driven to move the upper reach 23 in a direction toward the receiving conveyor 12 or 13 (depending upon the selected position of the conveyor 9). The construction of the conveyors 6, 7, 8, 11, 11a, 12, 12a, 13, 13a is preferably similar to or identical with that of the heretofore described portion of the conveyor 9, i.e., each conveyor preferably comprises a rigid frame and one or more endless belts whose upper reaches are flat and in register with the tops of the respective frames.

The frame 22 of the conveyor 9 is movable along a pair of stationary guide rails 28, 29 which are affixed to stationary carriers 31, 32. The rails 28, 29 extend in parallelism with one another and transversely of the transporting units I and II (transversely of the plane of FIG. 4) and are sufficiently long to allow for movement of the intermediate conveyor 8 therealong all the way between the positions of FIGS. 1 and 2. The frame 22 of FIG. 4 has two wheels 33, 34 each of which constitutes or includes an antifriction bearing (e.g., a ball bearing) rotatable about a horizontal axis and arranged to roll along the top face of the respective guide rail 28, 29. The frame 22 carries two additional antifriction (e.g., ball) bearings 36, 37 whose outer races are rotatable about vertical axes and which respectively engage the respective side faces or flanks 28a, 28b of the lefthand rail 28 to thus ensure that the outer races of the bearings 33, 34 cannot move sideways, i.e., that the conveyor 9 cannot be derailed during movement (with or without the conveyor 8) transversely of the transporting units I and II. The frame 22 can support two or more pairs of antifriction bearings 36, 37, two or more bearings 33 and two or more bearings 34.

The drive means for the conveyor 9 comprises two elongated horizontal toothed racks 38, 39 which are parallel to the guide rails 28, 29 and are fixedly secured to the respective carriers 31, 32 by connectors 41, 42, respectively. The frame 22 further supports two elongated horizontal beams 43, 44 supporting downwardly extending brackets or columns 46, 47 for a horizontal shaft 48 of the drive means. The shaft 48 is rotatable about its own axis and its end portions are non-rotatably secured to pinions 49, 51 which respectively mate with the racks 38, 39. The prime mover means for rotating the pinions 49, 51 to thereby move the frame 22 along the guide rails 28, 29 comprises a reversible electric motor 52 whose output shaft transmits torque to the shaft 48 by way of a toothed belt transmission including toothed pulleys 53, 54 and an endless toothed belt 56. The toothed pulleys 53, 54 are non-rotatably secured to the output shaft of the motor 52 and to the shaft 48, respectively, so that they cannot move axially of the corresponding shafts. The motor 52 is mounted on the frame 22 in a manner which is not specifically shown in FIG. 4.

The shaft 48 further carries the disc 66 of a disc brake 62 whose brake shoes 63, 64 are movably supported by the column 46. The shoes 63, 64 are preferably actuatable by pneumatic means to move into or from friction-generating engagement with the respective sides of the disc 66 when the intermediate conveyor 9 reaches or approaches the one or the other end position. The brake 62 can replace the holding means 109 of FIG. 3 (and the holding means 108 as long as the intermediate conveyors 8, 9 remain locked to one another). The arrangement is preferably such that the brake 62 allows for gradual acceleration and causes gradual deceleration of the intermediate conveyor 8 and/or 9 in order to further reduce the likelihood of shifting of sheets which constitute the stacks 1 and/or 2.

The reference character 58 denotes in FIG. 4 one of two limit switches which are installed in the the circuit of the motor 52 and serve to ensure that the frame 22 is arrested before the intermediate conveyor 9 moves beyond its optimum end positions (i.e., beyond the end position of FIG. 1 on its way from the end position of FIG. 2 and vice versa). The means for actuating the limit switches 58 comprises a trip 57 which is mounted on the frame 22 and can shift wheel- or roller-shaped followers 61 on pivotable levers 59 of the respective limit switches 58.

The frame of the intermediate conveyor 8 preferably also carries bearings corresponding to the bearings 33, 34, 36, 37 to ensure reliable and predictable movement of such frame along the rails 28 and 29.

It is further clear that, in lieu of operating the apparatus in a manner as described in connection with FIGS. 1 to 3, it is equally possible to transport stacks 1, 2 to the receiving conveyors 11, 12 while the conveyor 13 is idle, or to transport stacks 1, 2 to the conveyors 12, 13 while the conveyor 11 is idle. With reference to FIG. 2, the conveyor 8 then serves to deliver stacks 1 to the conveyor 11 while the conveyor 9 delivers stacks 2 to the conveyor 12, and the conveyor 8 is empty when it is transferred to the position of FIG. 1 in order to enable the conveyor 9 to receive stacks 2 from the conveyor 7.

An important advantage of the improved apparatus is that it greatly enhances the versatility of the production line by rendering it possible to supply all stacks to a single processing machine or to supply stacks to several discrete processing machines. Moreover, the apparatus can transport the stacks 1 and 2 gently, i.e., without shaking or shifting of sheets relative to each other and/or relative to the respective belts. Moreover, the apparatus is constructed and assembled in such a way that its constituents can be readily installed in the space which is available in a paper processing plant. Still further, the conversion from one mode of operation to another mode can be completed rapidly and, if desired, in a fully automatic way.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for transporting stacked sheet-like commodities, particularly paper stacks, from a first station to a second station, particularly from a processing station to a packing station, comprising first and second elongated transporting units respectively including first and second supplying conveyors, first and second intermediate conveyors respectively arranged to receive commodities from said first and second supplying conveyors, and spaced apart first and second receiving conveyors respectively arranged to accept commodities from said first and second intermediate conveyors; means for separably locking said intermediate conveyors to each other for joint movement substantially transversely of said transporting units; powered means for engaging and disengaging said locking means; drive means for moving at least one of said intermediate conveyors transversely of said transporting units; and a third receiving conveyor between said first and second receiving conveyors, each of said intermediate conveyors being movable from a position of register with the supplying and receiving conveyors of the respective transporting unit to a position of register with said third receiving conveyor, said intermediate conveyors being jointly movable between a first end position in which the first intermediate conveyor registers with said first receiving conveyor and the second intermediate conveyor registers with said third receiving conveyor, and a second end position in which said first intermediate conveyor registers with said third receiving conveyor and said second intermediate conveyor registers with said second receiving conveyor, said locking means being disengageable by said powered means to allow for independent movements of said first and second intermediate conveyors into register with said first and second receiving conveyors, respectively.

2. The apparatus of claim 1, wherein said third receiving conveyor is disposed substantially midway between said first and second receiving conveyors.

3. The apparatus of claim 1, wherein each of said conveyors comprises at least one endless band having a flat upper reach arranged to transport commodities in a predetermined plane.

4. The apparatus of claim 1, further comprising means for releasably holding said first intermediate conveyor in register with said first supplying and receiving conveyors and means for releasably holding said second intermediate conveyor in register with said second supplying and receiving conveyors.

5. The apparatus of claim 1, wherein said locking means comprises at least one first locking element on said first intermediate conveyor, at least one second locking element on said second intermediate conveyor, and coupling means for separably securing the first and second locking elements to one another.

6. The apparatus of claim 5, wherein said powered means comprises electromagnetic means for moving said coupling means into engagement with said locking elements.

7. The apparatus of claim 5, wherein said powered means comprises fluid-operated means for moving said coupling means into engagement with said locking elements.

8. The apparatus of claim 1, further comprising at least one guide rail extending substantially transversely of said transporting units, said intermediate conveyors being arranged to move along said rail.

9. The apparatus of claim 8, wherein at least one of said intermediate conveyors comprises antifriction bearing means arranged to track said rail.

10. The apparatus of claim 8, wherein said rail has two side faces and at least one of said intermediate conveyors comprises a pair of antifriction bearings arranged to roll along said side faces while said one intermediate conveyor moves along said rail.

11. The apparatus of claim 1, wherein said drive means comprises a rack and pinion drive.

12. The apparatus of claim 11, wherein said rack and pinion drive comprises a shaft mounted in said one intermediate conveyor, a pinion on said shaft, a stationary rack adjacent to the path of movement of said one intermediate conveyor transversely of said transporting units and meshing with said pinion, and prime mover means for rotating said pinion.

13. The apparatus of claim 12, further comprising a guide rail for said one intermediate conveyor, said rack being parallel to said guide rail.

14. The apparatus of claim 12, wherein said prime mover means comprises a motor and said drive means further comprises a toothed belt transmission arranged to transmit torque from said motor to said pinion.

15. The apparatus of claim 1, further comprising means for braking said one intermediate conveyor.

16. The apparatus of claim 15, wherein said braking means comprises a disc brake.

17. The apparatus of claim 1, further comprising means for arresting said one intermediate conveyor in first and second positions of exact register with the respective supplying conveyor and said third receiving conveyor, respectively.

* * * * *